US012244344B2

(12) United States Patent
Germe et al.

(10) Patent No.: US 12,244,344 B2
(45) Date of Patent: Mar. 4, 2025

(54) LINK ESTABLISHMENT IN A MULTI-CELL WIRELESS NETWORK

(71) Applicant: SIGNIFY HOLDING B.V., Eindhoven (NL)

(72) Inventors: Michel Germe, Cormelles le Royal (FR); Haimin Tao, Eindhoven (NL); Andreas Felix Alfred Bluschke, Eindhoven (NL); Christian Jordan, Venlo (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 100 days.

(21) Appl. No.: 17/926,011

(22) PCT Filed: May 18, 2021

(86) PCT No.: PCT/EP2021/063070
§ 371 (c)(1),
(2) Date: Nov. 17, 2022

(87) PCT Pub. No.: WO2021/233871
PCT Pub. Date: Nov. 25, 2021

(65) Prior Publication Data
US 2023/0179300 A1  Jun. 8, 2023

(30) Foreign Application Priority Data

May 22, 2020  (EP) .................................... 20176010
Jun. 15, 2020  (EP) .................................... 20179874

(51) Int. Cl.
*H04B 10/114*  (2013.01)
*H04B 10/116*  (2013.01)

(52) U.S. Cl.
CPC ....... *H04B 10/116* (2013.01); *H04B 10/1149* (2013.01)

(58) Field of Classification Search
CPC .................................................... H04B 10/114
See application file for complete search history.

(56) References Cited

U.S. PATENT DOCUMENTS

| | | | |
|---|---|---|---|
| 10,250,948 B1 * | 4/2019 | Bortz | .................. H04N 21/4788 |
| 2009/0047760 A1 * | 2/2009 | Yamazaki | ............... H01L 29/04 |
| | | | 257/E21.414 |

(Continued)

FOREIGN PATENT DOCUMENTS

| | | |
|---|---|---|
| EP | 2953277 B1 | 5/2019 |
| WO | 2014085128 A1 | 6/2014 |
| WO | 2018206107 A1 | 11/2018 |

OTHER PUBLICATIONS

Jaafaru Sanusi, et al., "Handover in Hybrid LiFi and WiFi Networks", 15th International Conference on Electronics Computer and Computation (ICECCO 2019), Dec. 10, 2019, pp. 1-6.

(Continued)

*Primary Examiner* — Shi K Li (57) ABSTRACT

In a multi-cell wireless communication system (100) with at least one optical access point (120) and at least one radio frequency access point (120), more flexibility is provided to an end device (110) in selecting an access point (120) for establishing a data link. Because of the line-of-sight characteristic of an optical link and the limited field of view of an optical receiver, optical cells are typically deployed with a relatively high density and adjacent optical cells may have an overlapping area. This invention discloses a method of an end device (110) for selecting a favorable access point (120) with reduced overhead, even when the end device is located in the overlapping area of two adjacent optical cells.

18 Claims, 8 Drawing Sheets

(56) References Cited

U.S. PATENT DOCUMENTS

2016/0088511 A1* 3/2016 Nguyen ............... H04L 5/006
                                                    398/115
2016/0295380 A1* 10/2016 Pitchaiah ............ H04W 4/08
2017/0195644 A1* 7/2017 Shatz ................. G06T 19/006

OTHER PUBLICATIONS

Vasilis K. Papanikolaou, et al., "Li-Fi and WiFi with Common Backhaul: Coordination and Resource Allocation", 2018 IEEE Wireless Communications and Networking Conference (WCNC), Apr. 15, 2018, pp. 1-6.

Amin Tang, et al., "Design and Implementation of an Integrated Visible Light Communication and WiFi System", 2018 IEEE 15th International Conference on Mobile Ad Hoc and Sensor Systems (MASS), Oct. 9, 2018, pp. 1-9.

LAN/MAN Standards Committee of the IEEE Computer Society, "IEEE Standard for Local and Metropolitan Area Networks—Part 15.7: Short-Range Optical Wireless Communications," IEEE Draft, Retrieved From the Internet: URL: grouper.ieee.org/groups/802/15/private/raft/tg7r1/p802-15-7r1-d2.pdf, Retrieved on Apr. 13, 2018.

\* cited by examiner

LINK ESTABLISHMENT IN A MULTI-CELL WIRELESS NETWORK

CROSS-REFERENCE TO PRIOR APPLICATIONS

This application is the U.S. National Phase application under 35 U.S.C. § 371 of International Application No. PCT/EP2021/063070, filed on Nov. 18, 2021, which claims the benefits of European Patent Applications Nos. 20179874.1, filed on Jun. 15, 2020, and 20176010.5, filed on May 22, 2020. These applications are hereby incorporated by reference herein.

FIELD OF THE INVENTION

The invention relates to the field of optical wireless networks, such as Li-Fi networks. More particularly, various methods, apparatus, systems, and computer-readable media are disclosed herein related to an end device for establishing a data link in a multi-cell wireless network.

BACKGROUND OF THE INVENTION

To enable more and more electronic devices like laptops, tablets, and smartphones to connect wirelessly to the Internet, wireless communication confronts unprecedented requirements on data rates and also link qualities, and such requirements keep on growing year over year, considering the emerging digital revolution related to Internet-of-Things (IoT). Radio frequency technology like Wi-Fi has limited spectrum capacity to embrace this revolution. In the meanwhile, light fidelity (Li-Fi) is drawing more and more attention with its intrinsic security enhancement and capability to support higher data rates over the available bandwidth in visible light, Ultraviolet (UV), and Infrared (IR) spectra. Furthermore, Li-Fi is directional and shielded by light blocking materials, which provides it with the potential to deploy a larger number of access points, as compared to Wi-Fi, in a dense area of users by spatially reusing the same bandwidth. These key advantages over the wireless radio frequency communication make Li-Fi a promising secure solution to mitigate the pressure on the crowded radio spectrum for IoT applications. Other benefits of Li-Fi include guaranteed bandwidth for a certain user, and the ability to function safely in areas otherwise susceptible to electromagnetic interference. Therefore, Li-Fi is a very promising technology to enable the next generation of immersive connectivity.

There are several related terminologies in the area of lighting-based communication. Visible-light communication (VLC) transmits data by intensity modulating optical sources, such as light emitting diodes (LEDs) and laser diodes (LDs), faster than the persistence of the human eye. VLC is often used to embed a signal in the light emitted by an illumination source such as an everyday luminaire, e.g. room lighting or outdoor lighting, thus allowing use of the illumination from the luminaires as a carrier of information. The light may thus comprise both a visible illumination contribution for illuminating a target environment such as a room (typically the primary purpose of the light), and an embedded signal for providing information into the environment (typically considered a secondary function of the light). In such cases, the modulation may typically be performed at a high enough frequency to be beyond human perception, or at least such that any visible temporal light artefacts (e.g. flicker and/or strobe artefacts) are weak enough and at sufficiently high frequencies not to be noticeable or at least to be tolerable to humans. Thus, the embedded signal does not affect the primary illumination function, i.e., so the user only perceives the overall illumination and not the effect of the data being modulated into that illumination.

The IEEE 802.15.7 visible-light communication personal area network (VPAN) standard maps the intended applications to four topologies: peer-to-peer, star, broadcast and coordinated. Optical Wireless PAN (OWPAN) is a more generic term than VPAN also allowing invisible light, such as UV and IR, for communication. Thus, Li-Fi is generally accepted as a derivative of optical wireless communications (OWC) technology, which makes use of the light spectrum in a broad scope to support bi-directional data communication.

In a Li-Fi system, the signal is embedded by modulating a property of the light, typically the intensity, according to any of a variety of suitable modulation techniques. For communication at high speed, often Infrared (IR) rather than visible light communication is used. Although the ultraviolet and infrared radiation is not visible to the human eye, the technology for utilizing these regions of the spectra is the same, although variations may occur as a result of wavelength dependencies, such as in the case of refractive indices. In many instances there are advantages to using ultraviolet and/or infrared as these frequency ranges are not visible to the human eye, and more flexibility can be introduced in the system. Of course, ultraviolet quanta have higher energy levels compared to those of infrared and/or visible light, which in turn may render use of ultraviolet light undesirable in certain circumstances.

Based on the modulations, the information in the light can be detected using any suitable light sensor or photodetector. For example, the light sensor may be a photodiode. The light sensor may be a dedicated photocell (point detector), an array of photocells possibly with a lens, reflector, diffuser, or phosphor converter (for lower speeds), or an array of photocells (pixels) and a lens for forming an image on the array. E.g., the light sensor may be a dedicated photocell included in a dongle which plugs into a user device such as a smartphone, tablet or laptop, or the sensor may be integrated and or dual-purpose, such as an array of infrared detectors initially designed for 3D face recognition. Either way this may enable an application running on the user device to receive data via the light.

In the following, the term "access point" of a Li-Fi system is used to designate a logical access device that can be connected to one or more physical access devices (e.g. optical transceivers). Such a physical access device may typically, but not necessary, be located at a luminaire and the logical access point may be connected to one or more physical access devices each located at one or more luminaires. An access point in turn may serve one or more network devices or end devices associated to it to thereby form an optical cell.

TANG AIMIN ET AL "Design and Implementation of an Integrated Visible Light Communication and WiFi System" is related to an integrated VLC and WiFi system, where the access point (AP) supports downlink VLC and bi-directional WiFi communication. A VLC radio access procedure will be triggered at a mobile user side only when the mobile user receives a VLC beacon frame that comprises the same service set identifier (SSID) of a WiFi radio, with which the mobile user has already established a connection.

EP2953277B1 is related to a switching method for visible light communication terminal at an access point.

SUMMARY OF THE INVENTION

To enable an electronic device or an end device to support higher data rate communication in view of IoT applications, optical wireless communication or Li-Fi is proposed as a complementary, or even replacing, technology to a wired connection or a radio-based wireless communication. Although the line-of-sight character of optical wireless communication provides the intrinsic security of an optical link, because of limited field-of-views (FoV) of optical receivers, optical cells are usually deployed with a relatively high density with each cell having a relatively small coverage.

On the other hand, Wi-Fi is one of the most widely used wireless communication technologies for local area networking. Wi-Fi networks are deployed almost everywhere, at home, in the office, in the bus, on the train, at the station, at the airport, at the stadium, and etc. Thus, it is advantageous to integrate Li-Fi access points to an existing infrastructure, such as a Wi-Fi infrastructure, to provide the connection between the Li-Fi access points and the backbone network.

The coexistence of radio frequency (RF) and optical networks in the same area also provides more flexibility to the end device. Depending on the application requirements, the end device may preferentially select one network and keep the other network as a backup mode. The end device may also use the two types of networks in combination. Furthermore, when the end device is located in an overlapping area of two adjacent optical cells, the end device needs to select one out of the two adjacent access points to establish an optical data link.

In view of the above, the present disclosure is directed to methods, apparatus, systems, computer program and computer-readable media for providing a mechanism to assist an end device for establishing a data link with one access point out of a plurality of access points in a multi-cell network. More particularly, the goal of this invention is achieved by a method of establishing a data link by an end device as claimed in claim 1, by an end device as claimed in claim 11, by a system as claimed in claim 14, and by a computer program as claimed in claim 15.

In accordance with a first aspect of the invention a method of establishing a data link by an end device is provided. A method of establishing a data link by an end device with one out of a plurality of access points in a multi-cell wireless communication network, wherein the plurality of access points comprises at least one optical access point, the method comprises the end device monitoring an optical signaling channel for occurrence of one or more identification codes; selecting an access point for establishing the data link, according to the detection of the one or more identification codes, and wherein the data link is established on another channel other than the optical signaling channel; when the selected access point is an optical access point, adjusting one or more settings corresponding to the selected optical access point; and establishing the data link on the other channel with the selected optical access point after the adjustment; wherein each one of the one or more identification codes is used to uniquely identify an optical access point.

The multi-cell wireless communication network may be deployed in different scenarios, such as at home, in an office, in a factory, in a stadium, in an exhibition hall, at an airport, or another indoor environment. The end device can be a portable device, such as a smart phone, a tablet, a laptop, a remote controller, or another mobile device. The end device can also be an electronic device with less mobility, such as home appliance, a docking station, or a robotic workstation.

In order to select an access point to establish a data link, the method comprises the end device monitoring an optical signaling channel for one or more identification codes. The data link is to be established on another channel other than the optical signaling channel. Each identification code is sent by an optical access point to advertise the presence of itself. Such an identification code is used to uniquely identify a certain optical access point. Upon the detection of at least one identification code on the optical signaling channel, the end device is able to assess the availability of an optical access point with a direct line-of-sight channel. Thus, it is also beneficial to guarantee the same coverage of the optical communication for ID detection and for the data link. Note that the data link here indicates the logical connection between an access point and the end device for data communication, which may comprise one or more physical channels that are distinguished from one another by frequency or wavelength.

In a preferred embodiment, when there is more than one identification code detected, the optical access point corresponding to the identification code detected with better received signal quality is selected for establishing the data link.

With more than one identification code detected, the end device may recognize that it is located in the overlapping area of multiple adjacent optical access points. The signal quality is an indication of the quality of received signal, which may be reflected by the received signal strength, or signal-to-noise ratio of the received signal. Thus, the end device may opt for one optical access point having the best channel condition. And hence, a more robust data link can be established. Better channel condition may also indicate a higher data rate may be supported on the data link with a higher order modulation scheme, or the same data rate may be supported with lower transmission power. When the detected more than one identification code is accidentally about the same received signal quality, the end device may randomly select one optical access point out of the more than one candidate optical access points represented by the identification codes detected. The end device may also further consider the corresponding one or more settings of each optical access point in making the selection. For example, if one setting of a first optical access point indicates a higher data rate to be supported than a second optical access point, the end device may preferentially select the first optical access point for establishing the data link.

In a more preferred embodiment, the one or more identification codes are orthogonal to each other.

In one example, the optical signaling channel may comprise only a single narrow channel, and the one or more optical access points may use the same narrow channel to send the individual identification code at a relatively low data rate. The benefit of this option is that it is very power efficient for the optical access points to send and for the end device to detect on such a narrowband channel for signaling exchange. However, for an end device located in the overlapping area of two adjacent optical access points, it is also necessary to address the interference problem for the detection on the signaling channel. Thus, it is beneficial to use orthogonal codes as the identification codes.

Advantageously, the one or more identification codes are Hadamard codes. Hadamard codes, also known as Walsh codes or Walsh-Hadamard codes, are usually used for error detection and correction when transmitting messages over noisy or unreliable channels. The Hadamard code is a code with low information rate but high distance. Considering the number of direct neighboring optical access points is very limited, low information rate is not a problem here, but high distance between two codes is a very attractive feature. For a Hadamard code of length $2^k$, the distance between two codewords is $2^{k-1}$.

Thus, as long as the end device is not located with the exact same distance to the two adjacent optical access points, it will be possible for the end device to identify each one of the two overlapping identification codes. Even when the end device detects equally "strong" identification codes from two adjacent optical access points, it is possible for the end device to randomly select one out of the two adjacent access points.

Advantageously, the other channel for the data link can be either an optical data channel or a radio frequency, RF, data channel.

Considering the scenario that the wireless optical network may coexist with an existing wireless radio network deployed in the same area, it is beneficial to allow the end device to have the flexibility to choose between the two networks by using either an optical data channel and an RF data channel.

In a preferred setup, when there are no identification codes detected, the data link is established on a RF data channel.

If the end device fails to detect any identification code, it may indicate that the end device is not in the line-of-sight of any optical access point or the optical channel between the end device and a nearby optical access point is not good enough, for example when receiving the optical signal at a very slanted angle. It may also possible that the optical access point is busy with another active link and is not available to establish a new link with the end device. In such scenarios, the end device will switch to a RF channel for establishing the data link.

In another embodiment, each one of the one or more identification codes is further used to specify a sub channel within an optical communication band to be used as the optical data channel for the data link.

In addition to identifying an optical access point, the identification code may also be used to convey other information, such as to specify a sub channel within an optical communication band to be used for the data link. This is especially beneficial when adjacent optical access points are sharing the same optical band in a frequency-division or wavelength-division multiplex. It may also be possible that within the same optical cell multiple end devices may share the optical communication band, or a certain portion of it, in a frequency-division or wavelength-division manner.

Advantageously, when there is only one identification code detected, the optical data channel may be extended to include more than one sub channels within the optical communication band.

With only one identification code detected, the end device may conclude that it is not in the overlapping area of two adjacent access points, and thus it may think about channel bonding by extending the optical data channel to more than one sub channels. The end device may send a request via an uplink communication with the optical access point associated with the only one identification code. The request may be sent on the optical signaling channel, or on the data link to be established. With the latter option, the initial data link may be first established on the sub channel as specified by the optical access point, and then be extended to more than one sub channels after the optical access point receives the feedback from the end device. Such a request may also be rejected by the optical access point if that may introduce interference to other communication links.

In another embodiment, the one or more identification codes are further used to specify a configuration to be used on the data link.

Further configuration information may also be specified by the optical access points via the identification code. As one example, an optical access point may already indicate that channel binding is possible for the end device, if the end device will only detect one identification code. Or the optical access point may instruct the end device to use more than one sub channels, such as when the optical access point already gets aligned with adjacent optical access points or there is no other active optical access points in the neighborhood. Such further configuration information may be enabled by using a different orthogonal code rather than the default identification code of the access point.

Therefore, the identification code may be used to inform the end device from one or more aspects, such as to identify an access point, a type of access point, or another configuration setting (e.g. an optical communication band or wavelength to be used for the data link, a subchannel in the selected/default optical communication band to be used for the data link). Such information may be embedded in the identification codewords, and with different combination of the one or more aspects a different codeword may be used by the same optical access point. And hence, the length of the orthogonal codes, or the size of the entire codewords, is a design tradeoff of the identification codes in terms of energy efficiency, robustness, and the amount of actual information carried by the code. The longer the code the more information can be delivered, but it will also be less energy efficient for the transmission and reception of the long code.

The optical signaling channel may be comprised in the optical data channel on a time-sharing or frequency sharing basis. For example, the optical signaling channel may occupy a small portion on the optical data channel in the frequency domain.

Beneficially, the optical signaling channel is different from the optical data channel.

With a separate or dedicated optical signaling channel, the one or more identification codes may be sent continuously by the one or more access points on the signaling channel to advertise the presence of themselves. Hence, the end device may detect the one or more identification codes promptly. It may also be possible that the one or more identification codes are sent periodically by the one or more access points, such as every advertisement cycle. And then, the end device may be required to monitor the signaling channel for at least one complete advertisement cycle for a reliable detection.

In another example, when an access point is not available for a new data link, for example there is already one or more active data links established by the access point and there is no extra capacity available, the separate signaling channel may be used to send another signal, such as a busy tone, to indicate the status of the access point. In one example, the access point may send a busy tone on the separate signaling channel when it is receiving message from an end device on the uplink optical data channel. In this way, the hidden node problem can be avoided. Since optical communication requires direct line-of-sight (LoS), when there are two or more end devices in the coverage area of the access point, the access point can hear both, but the two or more end devices cannot hear each other's uplink. It is very beneficial to make use of the busy tone at the access point to suppress potential interference on the uplink optical communication from another end device. In this example, the identification code and the busy tone may be sent on a time-sharing basis by the access point on the separate signaling channel to either invite or decline an end device for establishing a data link, depending on the status of the access point.

In a preferred embodiment, the one or more settings comprise at least one hardware configuration.

By selecting an access point, the end device can also prepare itself for the data link by adjusting one or more settings. For example, the selected access point may be an optical access point or a RF access point, and when an optical access point is selected, different sub channels may be associated. And hence, the end device may need to adjust one or more hardware related settings to get ready for the data link. Such settings may be related to a connection to an optical front end, a connection to a radio front end, a switch between an optical front end and a radio front end, a control of a frequency shifter, or another control to enable certain part of a communication unit.

In accordance with a second aspect of the invention an end device is provided. An end device for establishing a data link with one out of a plurality of access points in a multi-cell wireless communication network, wherein the plurality of access points comprises at least one optical access point, the end device comprises:
- an optical receiver configured to monitor an optical signaling channel for occurrence of one or more identification codes;
- a controller configured to select an access point for establishing the data link, according to the detection of the one or more identification codes; and
- a wireless communication transceiver configured to adjust one or more settings corresponding to the selected access point and to establish the data link with the selected access point after the adjustment, when the selected access point is an optical access point;

wherein each one of the one or more identification codes is used to uniquely identify an optical access point.

The controller of an end device may be a processor, one or more microprocessors, or a dedicated hardware, such as application specific integrated circuits (ASICs), and field-programmable gate arrays (FPGAs).

Advantageously, the wireless communication transceiver is further configured to support either optical communication or RF communication upon the adjustment of one or more settings.

In one option, the wireless communication transceiver may comprise two separate hardware units to support optical communication and RF communication independently. And the adjustment of one or more settings comprise the selection between the two separate hardware units. In another more cost-effective option, the wireless communication transceiver enables both optical communication and RF communication with a certain part shared by both communication modes, such as for example a common baseband modulator, while some other parts are dedicated to one communication mode.

In a further example, the optical communication mode reuses the entire hardware unit of the RF communication mode, and a further dedicated hardware unit is enabled to convert the signals from the RF communication mode to the optical mode.

In another embodiment, the optical receiver is part of the wireless communication transceiver.

The optical receiver may be shared by both the optical signaling channel and the optical data channel. And thus, the optical receiver is part of the wireless communication transceiver. In an alternative option, the optical receiver is a dedicated hardware-based receiver, which may be optimized for very low power consumption and low cost. The dedicated hardware-based receiver may be used to wake up the wireless communication transceiver, after the access point is selected by the controller.

In accordance with a third aspect of the invention a system is provided. A multi-cell wireless communication system comprising at least one end device according to the present invention, at least one RF access point configured to set up data communication with the at least one end device, and at least one optical access point configured to set up data communication with the at least one end device; and wherein the at least one optical access point is further configured to send an identification code on the optical signaling channel.

In one example, the optical access point may be coupled to a luminaire, which supports coded light (CL) communication. The identification code may be sent as a coded light message, and can be detected by the end device, such as via a camera or another detector. The optical data communication, or the data link, may be established between the optical access point and the end device via a different optical channel, such as a Li-Fi channel in UV or IR spectra. Thus, visible light communication may be used as a signaling channel for Li-Fi communication.

Being deployed in the same area, the at least one RF access point and the at least one optical access point may share the same infrastructure to connect to the backbone network, and in the meanwhile provide more flexibility to the end device for the last tens of meters connectivity. In one example, the end device may preferentially select the optical network rather than the RF network when both connections are available and keep the RF network as a backup mode. Considering the small coverage area of an optical cell, when the end device is located in an overlapping area of two adjacent optical cells, to establish a reliable data link the end device may be required to select among the two adjacent optical access points and the RF access point, such as two adjacent Li-Fi access point and the Wi-Fi access point.

The invention may further be embodied in a computer program comprising code means which, when the program is executed by an end device comprising processing means, cause the processing means to carry out the method of the end device as disclosed in the present invention.

BRIEF DESCRIPTION OF THE DRAWINGS

In the drawings, like reference characters generally refer to the same parts throughout the different figures. Also, the drawings are not necessarily to scale, emphasis instead generally being placed upon illustrating the principles of the invention.

DETAILED DESCRIPTION OF EMBODIMENTS

Figure 1:
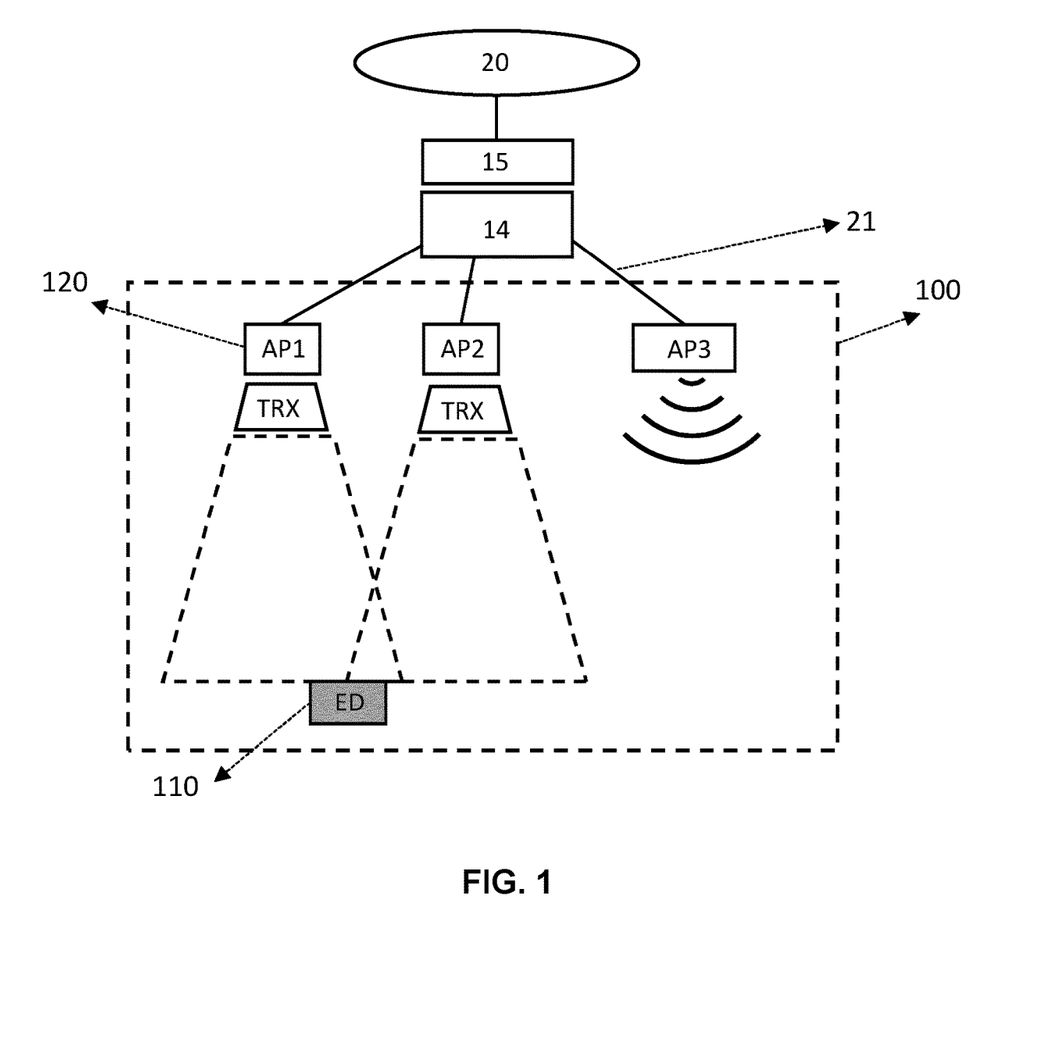
FIG. 1 demonstrates an overview of the multi-cell wireless system, with the backbone network connected to it.

Various embodiments of the present invention will now be described based on a multi-cell wireless communication system, which can be a combination of one or more RF networks and one or more optical wireless networks, or more specifically Li-Fi networks, as shown in FIG. 1. For illustration purposes, the multi-cell wireless communication system 100 is connected to a backbone network 20 via an IP router 15 and an Ethernet switch 14, while in a practical system more routers and switches may be deployed to connect the backbone network to the multi-cell wireless communication system. Note that the Ethernet switch 14 and the IP router 15 are also part of the backbone network. The symbol of the backbone network 20 in FIG. 1 is for illustration purpose, which should be considered as the rest part of the backbone network apart from the Ethernet switch 14 and the IP router 15 shown in the figure. In this example, the connection between the Li-Fi network and the backbone network is called a backbone connection 21. The backbone connection is a stable and high-speed link, which can be a wired connection, such as Ethernet, optical fiber, or a wireless connection based on radio frequency (RF) or millimeter-wave. The backbone connection can also be another kind of optical wireless link that is different from the one that an end device is performing in the multi-cell wireless network. One example of the other kind of optical wireless link can be free space point-to-point optical links.

The multi-cell wireless communication system 100 comprises a plurality of access points (APs) 120 and one or more network devices or end devices (EDs) 110. In the example of FIG. 1, AP1 and AP2 are optical access points, or preferably Li-Fi access point, and AP3 is a RF access point, or preferably a Wi-Fi access point, e.g. WiFi-6, or a cellular small cell. As a wireless communication technology for local area networking, Li-Fi plays a similar role as Wi-Fi to provide the last meters connectivity. However, because of the different signal propagation properties, the coverage area of a Wi-Fi access point is typically much bigger than the coverage area of a Li-Fi access point. Optical access points are thus deployed in a relatively higher density as compared to RF access points.

An optical AP 120 may be connected to one or multiple optical front ends or optical transceivers (TRX), for providing access to an end device 110. The trapezoids shown in dash lines illustrate field-of-views (FoVs) or coverage of an individual optical front end. Only when an ED 110 is located in the coverage of an optical AP 120 (within the trapezoid of the AP), will it be able to receive a downlink communication from that AP 120. By assuming bidirectional up and down links of the optical communication, a bidirectional optical link can be built up under the same condition. Because of the line-of-sight character of the optical communication link, adjacent optical APs 120 do not have a direct optical link amongst each other, whereas an ED 110 located in the overlapping area of the coverage of adjacent APs 120 is able to detect optical signals from both access points. In the same example of FIG. 1, the end device 110 may select among AP1, AP2, and AP3 for establishing the data link.

When there are multiple Li-Fi APs deployed next to each other or when there are multiple EDs 110 associated to the same Li-Fi AP or to adjacent Li-Fi APs, medium access control (MAC) becomes necessary for interference free optical communication. For a multi-cell wireless network, different MAC mechanisms may be employed, such as time-division multiple access (TDMA), frequency-division multiple access (FDMA), carrier-sense multiple access (CSMA), code division multiple access (CDMA), space-division multiple access, or a combination of one or more aforementioned mechanisms. TDMA is based on a time-division multiplexing scheme, where radio resource access is scheduled in the time domain and different time slots are assigned to different transmitters in a typically cyclically repetitive frame structure or MAC cycles. FDMA is based on frequency-division multiplexing, where different frequency bands are allocated to different devices for simultaneous transmission. And in optical communication, FDMA can also be evolved into wavelength division multiple access (WDMA), which is based on wavelength-division multiplexing. Another advanced version of FDMA is orthogonal frequency-division multiple access (OFDMA), where each device may use one or more subcarriers out of the entire band. OFDMA has more flexibility in providing different data rates or quality of service to different users, and in the meanwhile a high resource efficiency can be maintained despite of such diversity. CSMA typically employs "listen-before-talk" approach, where a device verifies the absence of any other traffic before transmitting on a shared medium. CSMA is widely used in a sparse network, and when the density of nodes scales, further collision-avoidance techniques come into place. CDMA is typically built on top of spread spectrum, and a common form is direct-sequence CDMA that is based on direct-sequence spread spectrum, where different devices send messages simultaneously with different spreading codes that are orthogonal to each other. Given the typically smaller FoV of an optical link as compared to a radio link, space-division multiple access may also be a very attractive solution here.

In a TDMA-based multi-cell network with multiple optical APs or Li-Fi APs, due to the lack of direct communication, adjacent APs sometimes may not have synchronous MAC cycles. Although the durations of one MAC cycle or super frame is typically the same for all the APs in the network, the start times of MAC cycles can be different for individual APs. Note that the start time of a MAC cycle is used by an AP as a local time reference to divide the wireless medium into consecutive time slots. Such an offset of MAC cycles among two adjacent APs may cause interference to an ED 110 located in the overlapping coverage areas of these two adjacent Li-Fi APs, even when a time slot is allocated exclusively to one Li-Fi AP for communication with the ED 110 in the overlapping area. Therefore, it may be necessary for the optical APs to synchronize to a common time base. The common time base may be obtained via synchronization handshake, via a reference clock distributed over the network (such as synchronous Ethernet clocks), or via a dedicated synchronization server in the network, or derived from a common signal, such as the zero crossing of the mains power. However, due to an uncertain delay in the network or an interference, there may still be timing synchronization uncertainty of the optical APs against the timing reference.

FDMA does not require precise time synchronization between the APs and does not need a master or Li-Fi controller for MAC cycle planning, and therefore may be more cost effective and easy to implement in certain scenarios. To be able to select the correct frequency channel for an ED to establish a link with an AP, it is disclosed to use a novel identification code (ID) detection method for auto channel selection when an ED enters an optical AP's coverage area.

Adjacent APs in the overlap zone are arranged to emit different IDs. The ED detects the "strongest" ID at a certain location in the overlap zone and decides to operate in a frequency channel corresponding to that "strongest" ID. When the ED moves towards another AP with a different ID, it will then switch over to a different channel corresponding to the new ID detected. Since the adjacent APs in the overlap zone operate at different data communication channels, there will be no interference for the data communication in the overlap zone. When the ED detects only one ID, i.e., in a non-overlap zone, it can operate in full bandwidth mode to increase the data throughput. Furthermore, when no ID is detected, the ED can switch off the optical channel, e.g. the Li-Fi channel, and operate in an RF mode, e.g. the WiFi mode for data communication.

In one option, the optical AP may be configured to share the same optical data communication channel for both ID emission and data communication on a frequency division or time division basis, such that a small frequency portion of the optical data channel may be allocated to ID emission, or ID emission and data communication are scheduled on a time-sharing basis on the optical data channel.

Figure 2:
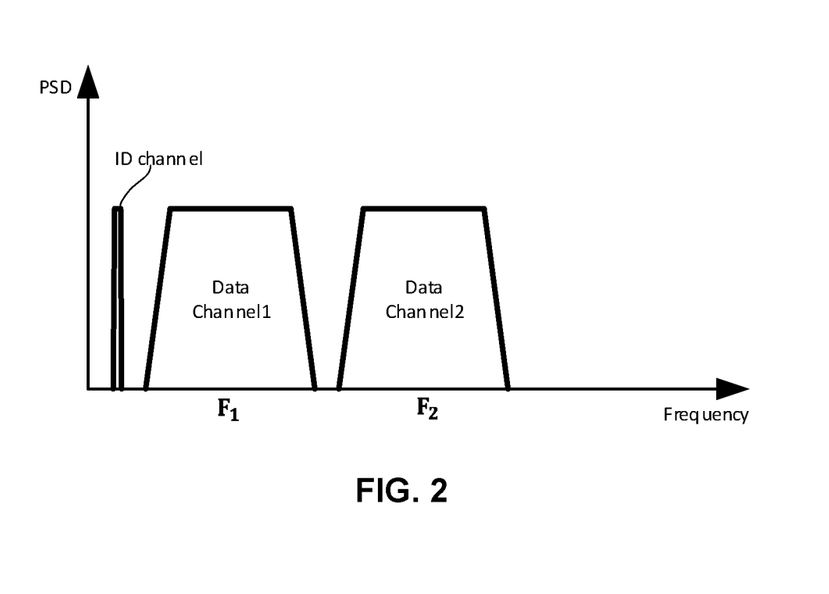
FIG. 2 illustrates a frequency division based optical multi-cell system with a separate optical signaling channel.

In another option, an optical AP may be configured to emit its ID at a low data rate continuously or periodically, on a separate signaling channel, which is different from the optical data communication channel. As shown in FIG. 2, ID channel is used as the separate signaling channel, while AP1 and AP2 share the same optical communication band in a FDMA manner. In this example, data channel 1 center at $F_1$ is allocated to AP1, while data channel 2 center at $F_2$ is allocated to AP2.

Figure 3:
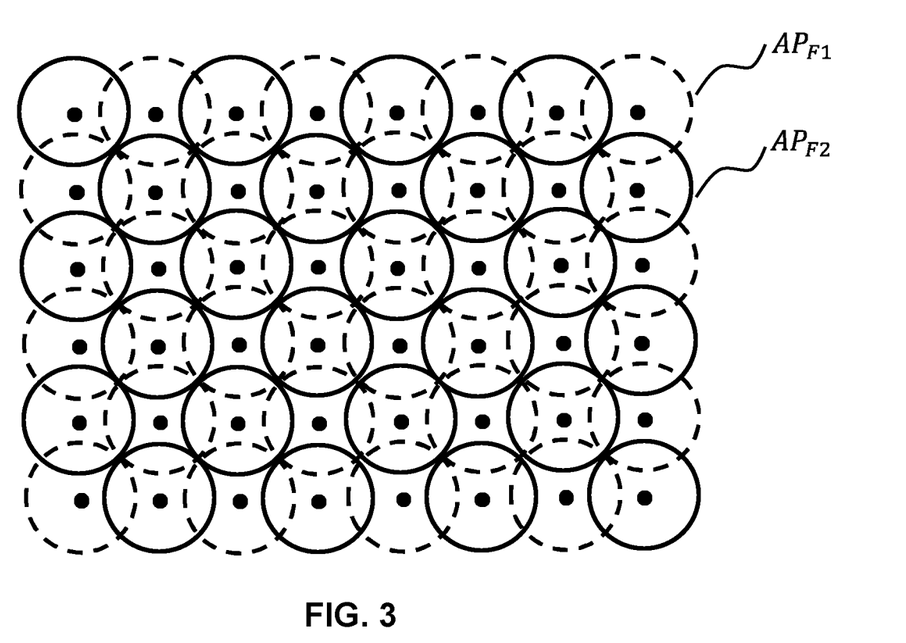
FIG. 3 illustrates the deployment of multiple optical cells based on frequency division.

FIG. 3 exemplarily demonstrates the deployment of multiple optical cells in an area. A circle indicates the coverage of one optical cell. The cells are indicated with either a solid line or a dash line. Basically, it is sufficient to divide the entire optical communication band into two portions, e.g. centered at $F_1$ and $F_2$ respectively, to arrange a FDMA scheduling among adjacent cells. In this example, the optical cells indicated with dash lines are operating at $F_1$, while the optical cells indicated with solid line are operating at $F_2$. In some application scenarios, more than two frequency channels may be required for interference suppression in such a multi-cell network. For instance, when the solid circles in the first row also overlap the solid circles in the second row, a third frequency channel may be required. Furthermore, if the dash line circles between the rows also overlap, a further frequency channel may be required.

The optical APs are preconfigured to operate at a certain frequency channel when they are installed or commissioned, which may be implemented in a software-based approach, such as with some configuration tool. Alternatively, the setting may be applied via a dip switch on the AP device, such that an installer can set the channel by setting the switch position (just on/off in case of only two channels).

Figure 4:
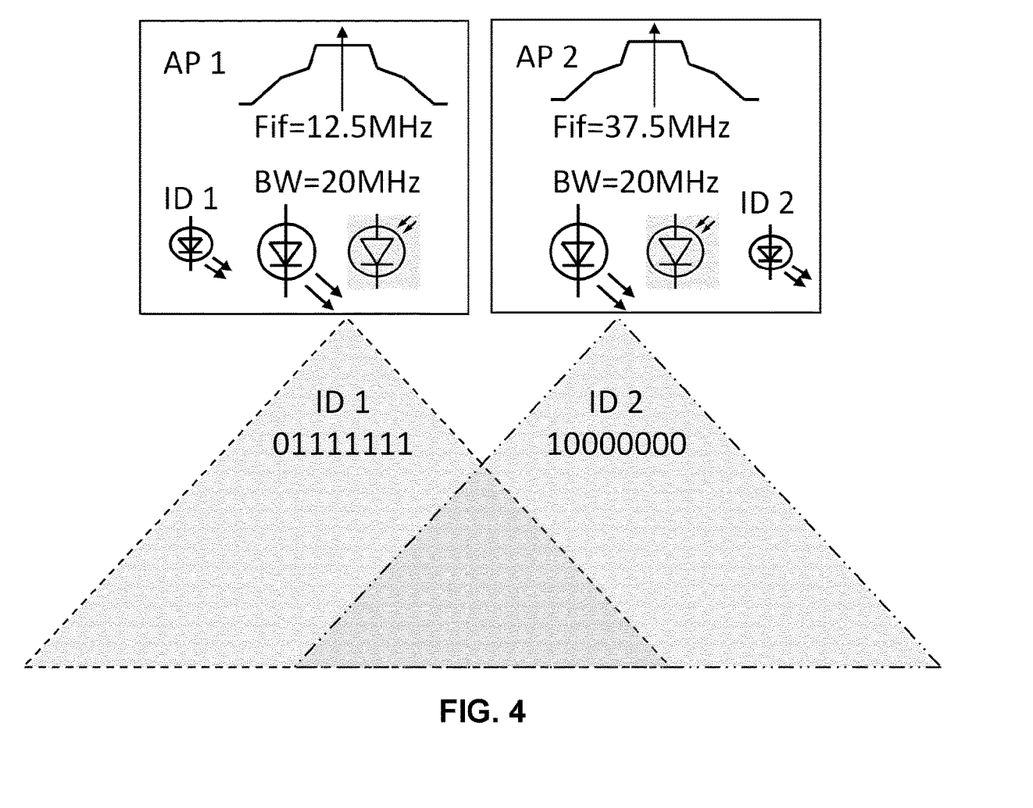
FIG. 4 illustrates the system setup using orthogonal identification codes for interference management among adjacent optical access points.

FIG. 4 illustrates the system setup of using orthogonal identification codes for interference management among adjacent optical access points. As one example shown in FIG. 4, AP1 operates in data channel 1 with a center frequency Fif of 12.5 MHz and AP2 operates in data channel 2 with Fif of 37.5 MHz. In this example, each data channel occupies 20 MHz bandwidth. Note that depending on the hardware characteristics the usable optical communication bandwidth for an optical access point can be much wider, which can be up to a few hundred MHz or even GHz. In this example, for illustration purpose, each channel is assumed to be 20 MHz, which is the same as a typical Wi-Fi data channel. AP1 is further configured to emit ID1 ("0111 1111") on the optical signaling channel, and AP2 is further configured to emit ID2 ("1000 0000"). According to the present invention, the following decision may be made by the end device side in different scenarios:

scenario 1: end device receives ID1 "0111 1111" → select Fif=12.5 MHz; BW=20 MHz →
scenario 2: end device receives ID2 "1000 0000" → select Fif=37.5 MHz; BW=20 MHz →
scenario 3: end device in overlap zone
   if more "1" than "0" received=>select Fif=12.5 MHz
   if more "0" than "1" received=>select Fif=37.5 MHz Thus, the end device will select an AP from which a stronger ID signal is detected, and then the end device will adjust its own Fif to align with the Fif of the selected AP. Hysteresis may be applied when switching from one Fif to another one to avoid continuous handover in the overlap zone, such as when a same level of ID signals are received from both APs. The disclosed interference management mechanism is autonomous. There is no need for APs to be synchronized and no need for a central controller to align timeslots among APs.

Figure 5:
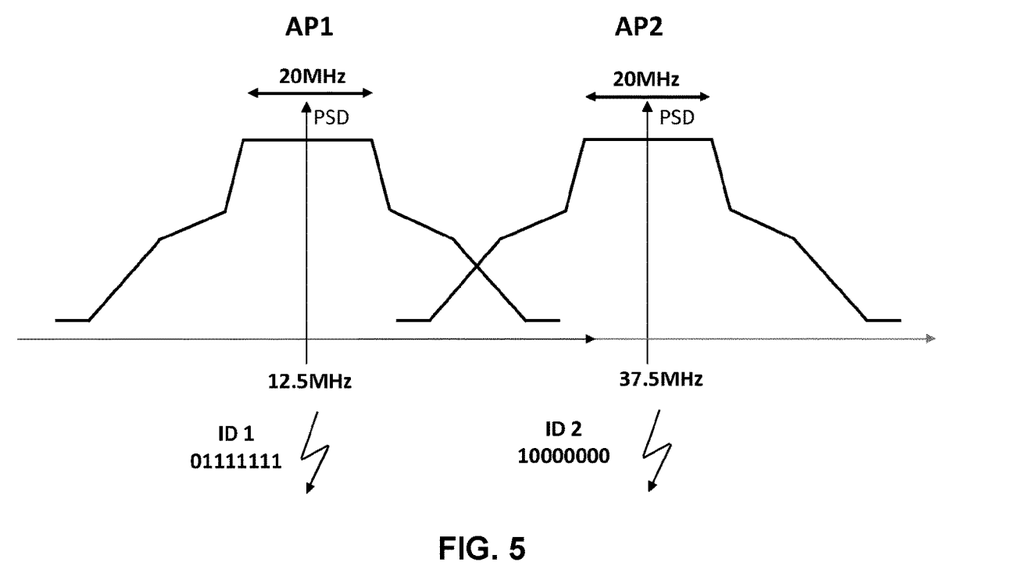
FIG. 5 demonstrates one implementation of frequency division for data communication and the use of ID emission at two adjacent optical access points.

FIG. 5 demonstrates one implementation of frequency division for data communication and the use of ID emission at two adjacent optical access points AP1 and AP2. It can be seen that the center frequencies of the two frequency channels are set apart to reduce the impact due to spectral leakage of the signals.

Figure 6:
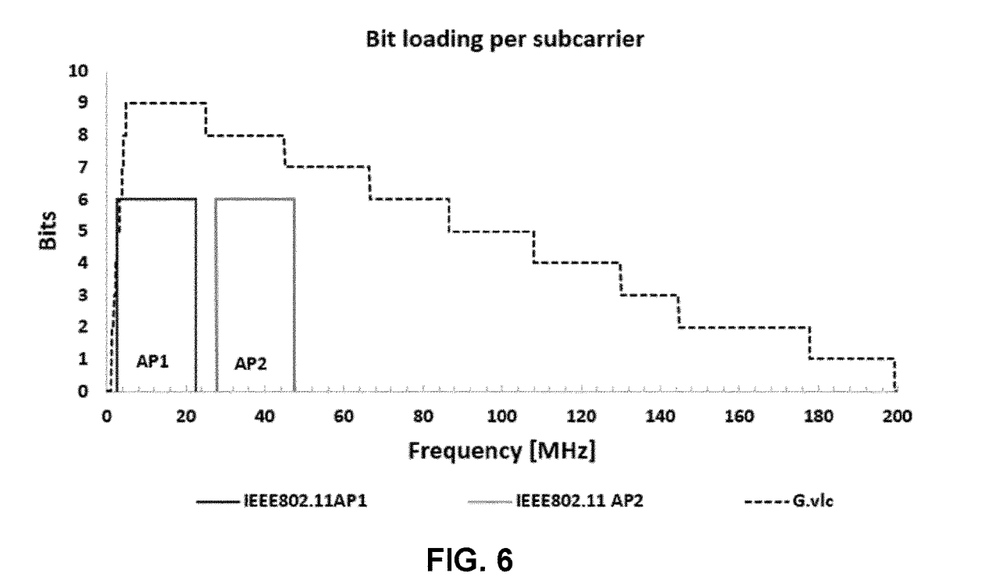
FIG. 6 illustrates one implementation of frequency division among two adjacent optical cells on an optical channel response graph.

In FIG. 6, the same example of frequency division among two adjacent optical cells AP1 and AP2 are illustrated on an optical channel response graph. Here, it shows a distribution of the two 20 MHz channels and the bit loading based on IEEE 802.11g protocol (max 6 bits per symbol). The blue curve shows a bit loading pattern with G.vlc with adaptive bit loading where the entire 200 MHz bandwidth is utilized. When the analog and optical frontend support larger bandwidth (e.g. 100 MHz, 200 MHz, or more), it is possible to implement 40 MHz or 80 MHz channel according to IEEE 802.11 protocol, and to accommodate at least two channels in parallel for interference suppression among adjacent optical cells.

Figure 7:
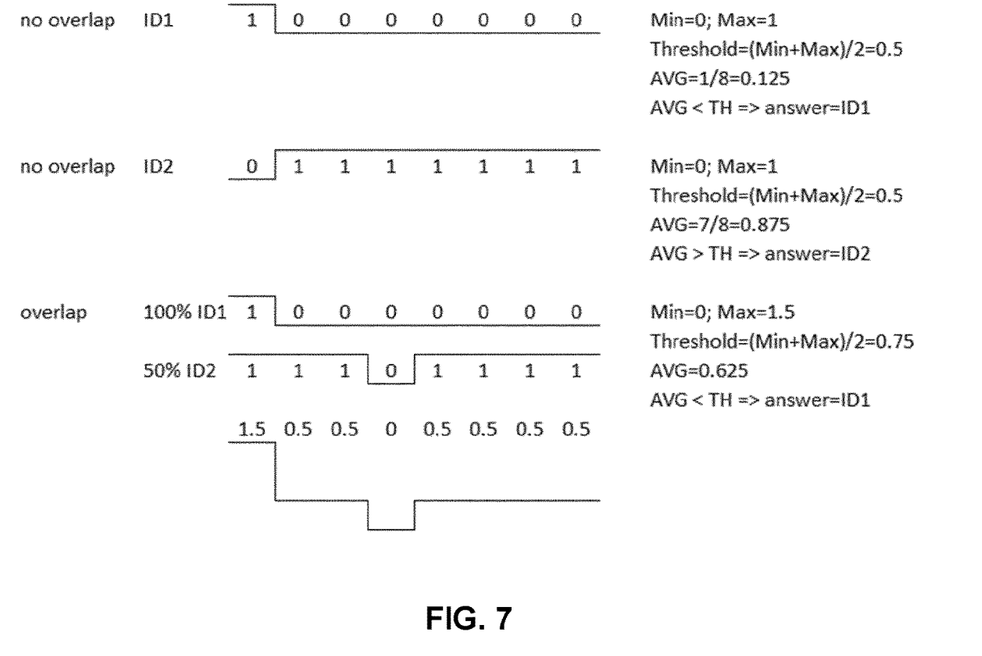
FIG. 7 illustrates use of orthogonal identification codes to distinguish one optical access point from another for an end device located in the overlapping area.

FIG. 7 gives a detailed example of using orthogonal identification codes to distinguish one optical AP from an adjacent AP by an end device located in the overlapping area. Considering the fact that the ID signals from adjacent APs are not synchronized, in the overlap area different pattens may be detected by the end device. As explained in the figure, the chosen ID patten, thanks to the orthogonality of the codes, is made robust enough to detect the "strongest" ID in the zone with the proposed method, even when there is no synchronization between the ID signals. In the example shown in FIG. 7, the amplitude of the received ID2 signal is about 50% of the amplitude of that of the received ID1 signal, due to the fact that AP2 is located further away from ED than AP1. By choosing a proper threshold for decoding the received hybrid signals, the correct decision can still be made.

Figure 8:
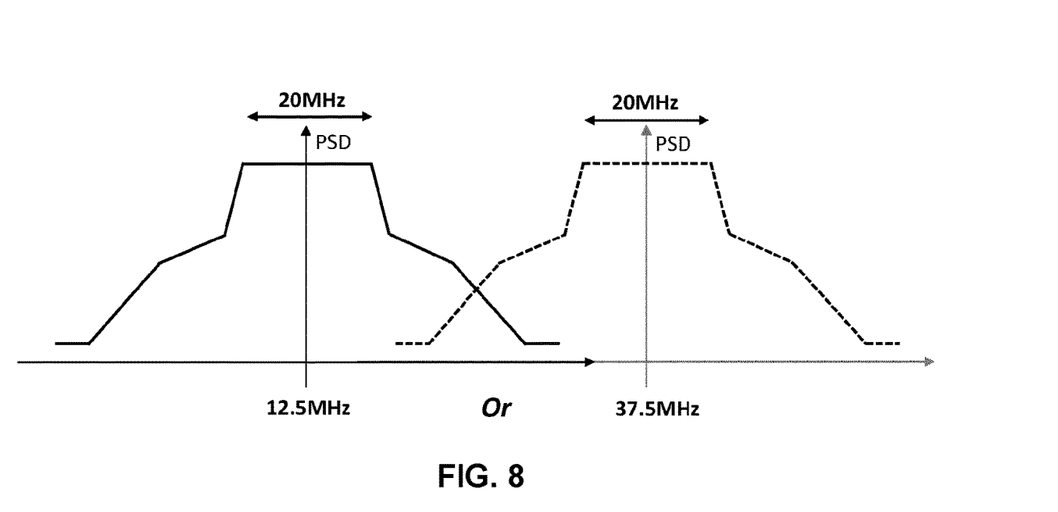
FIG. 8 illustrates a corresponding selection of the end device based on the detection of identification code as shown in FIG. 7.

FIG. 8 illustrates that the end device adjusts its Fif based on the detection of identification code as shown in FIG. 7. In this example, the end device select Fif of 12.5 MHz to get aligned with the selected access point AP1.

Figure 9:
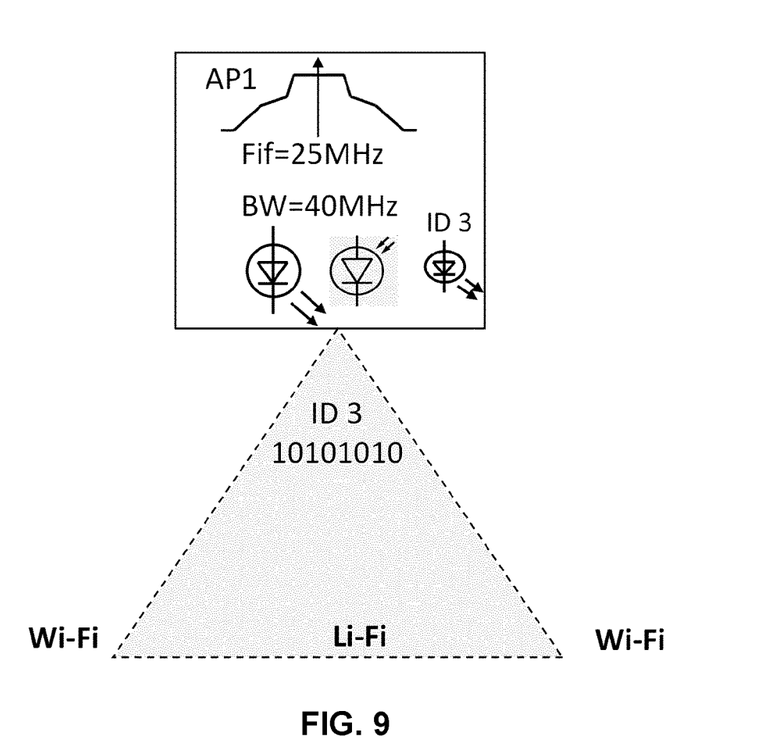
FIG. 9 illustrates channel bonding at one optical access point when there is no adjacent optical access point and potential vertical handover between a Li-Fi network and a Wi-Fi network.

FIG. 9 illustrates channel bonding at one optical access point when there is no adjacent optical access point and potential vertical handover between a Li-Fi network and a Wi-Fi network as an example. When there is no overlap zone between adjacent APs, an access point may be configured to utilize both channels, such as 40 MHz in this example, and to emit a third ID, ID3="1010 1010" to announce this. Correspondingly, the end device will make the following decision: → scenario 4: end device receives ID3="1010 1010" → select Fif=25 MHz; BW=40 MHz.

It may also happen that the end device detects only one access point that is emitting ID1 or ID2, and then the end device may send a request to the access point to propose that channel bonding may be possible. Such a request may be sent by the end device via the optical signaling channel before establishing the data link, or via the data link. When the request is sent via the data link, the data link may be initialized with the default data channel bandwidth as proposed by the access point, and then adapt to wider bandwidth, depending on the decision of the access point.

The same ID detection mechanism may also be used to realize vertical handover between optical networks and RF networks, such as between a Li-Fi AP and a Wi-Fi AP. When there is no ID detected such as when the end device roams outside the coverage of an optical cell, the EP can switch over to a Wi-Fi network. The advantage of doing so, is that when an existing optical link is blocked or list, the system can accommodate and automatically switch to the RF link. →

Scenario 5: end device does not detect any ID code → select RF channel.

Note the above examples are described with the example of 20 MHz bandwidth. This may be extended to broader bandwidth depending on the scheduling among adjacent optical access points, the scheduling among more than one end devices with the same access point, the capabilities of an optical front end and/or the rest part of the end device. A unique Li-Fi AP can be configured with different IDs and Fif settings, such as via a mechanical switch or via remote software control. The end device may have the pre-knowledge of the mapping between a certain identification code and the center frequency Fif of the channel, and then the end device may adjust its own Fif corresponding to a detected ID signal.

Alternatively, the ID signal can be sent in the form of a (single) frequency tone instead of a digital signal as described above. One AP may emit a frequency tone at a first frequency (e.g. 500 kHz) in the signaling channel corresponding, while the other AP may emit another frequency tone at a second frequency (e.g. 1 MHz). The end device may detect and compare the energy of these tones by using narrow bandpass filters.

Figure 10:
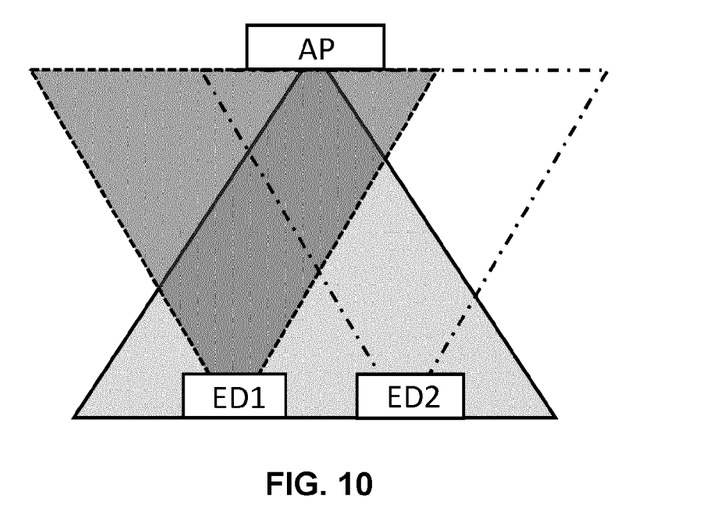
FIG. 10 demonstrates the use of busy tone to avoid hidden node problem.

Furthermore, other management signals can be sent along the ID signal, such as a "busy" signal when the AP is receiving message from and end device. This way, hidden nodes problem can be solved, as shown in FIG. 10. When there are two end devices (or more) in the coverage area of the AP, the AP can hear both EDs, but EDs can't hear each other (due to LoS requirement of an optical signal). With medium access method such as CSMA/CA in the 802.11 protocol this leads to collision in the up-link direction. In this example, AP has an active data link with ED1. In parallel to the data link with ED1, the AP may send via the signaling channel a "busy" signal when ED1 is sending message to it. Then, ED2 will be aware of the ongoing uplink from ED1 to the AP and will try to establish a new data link with the AP or an adjacent AP only after the "busy" signal is cleared. It may also be that the "busy" signal is implemented in an implicit manner. When there is active link between the AP and ED, the ID transmission is stopped. Other EDs in the same coverage area of the AP will not be able to detect the ID from the AP and thus will not be able to connect to the AP. In this way, message collision in the uplink for the AP may also be reduced.

Figure 11:
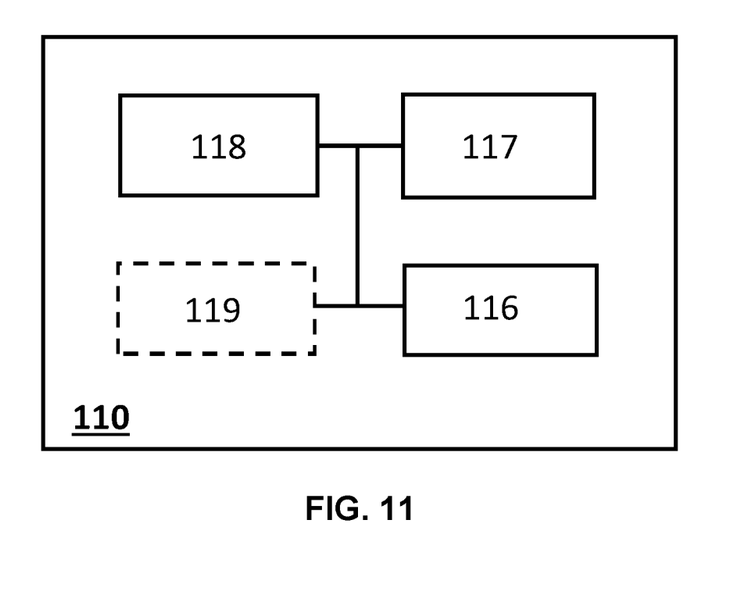
FIG. 11 schematically depicts basic components of an end device of the present invention.

FIG. 11 schematically depicts basic components of an end device of the present invention. The end device 110 comprises at least an optical receiver 116, a wireless transceiver 117, and a controller 118. The optical receiver 116 is configured to detect one or more identification codes on an optical signaling channel, which may be located in a subset of the optical spectrum, such as the infrared, the visible, or the ultraviolet spectrum. The wireless transceiver 117 is configured to support both RF data communication and optical data communication. The two different communication modes may be supported via two separate hardware units. And the adjustment of one or more settings comprise the selection between the two separate hardware units. In another more cost-effective option, the wireless communication transceiver 117 enables both optical communication and RF communication with a certain part of the transceiver shared by both communication modes, while some other parts are dedicated to one communication mode. For example, the modem and some analog circuits may be shared, while there are two different front ends, an RF front end and an optical front end. It may also be possible that a first communication mode reuses the entire hardware unit of a second communication mode, and a further dedicated hardware unit is enabled to convert the signals from the second communication mode to the first mode. Here either the optical communication mode or the RF communication mode may be the first communication mode.

The end device 110 may optionally comprise a user interface 119, which can provide users with added convenience of status inquiry or operation of the device. For example, via the user interface 119, the user may query the status of a data link, such as the actual data rate, or set a preference of the user when selecting among an optical network and a RF network.

Figure 12:
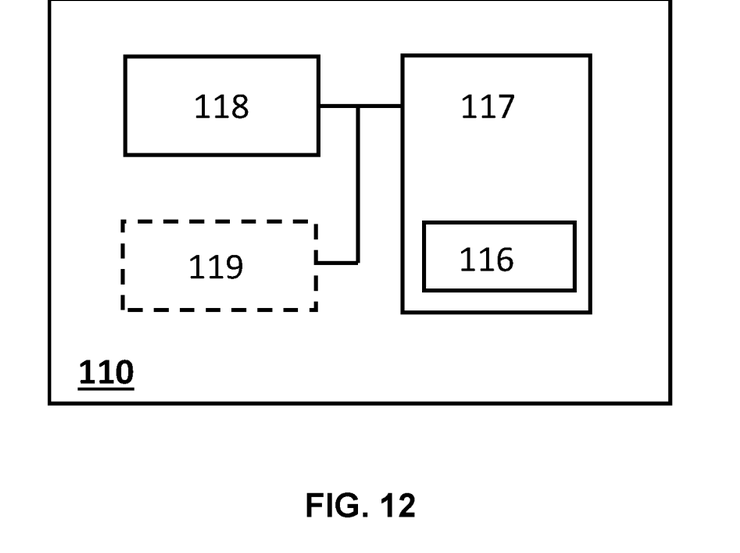
FIG. 12 schematically depicts basic components of an end device of the present invention with another setup.

FIG. 12 schematically depicts another setup of the end device, where the optical receiver 116 is part of the wireless transceiver 117. This also indicates that the optical signaling channel may be shared on the optical data communication channel on a frequency division basis or time division basis, as disclosed above.

Figure 13:
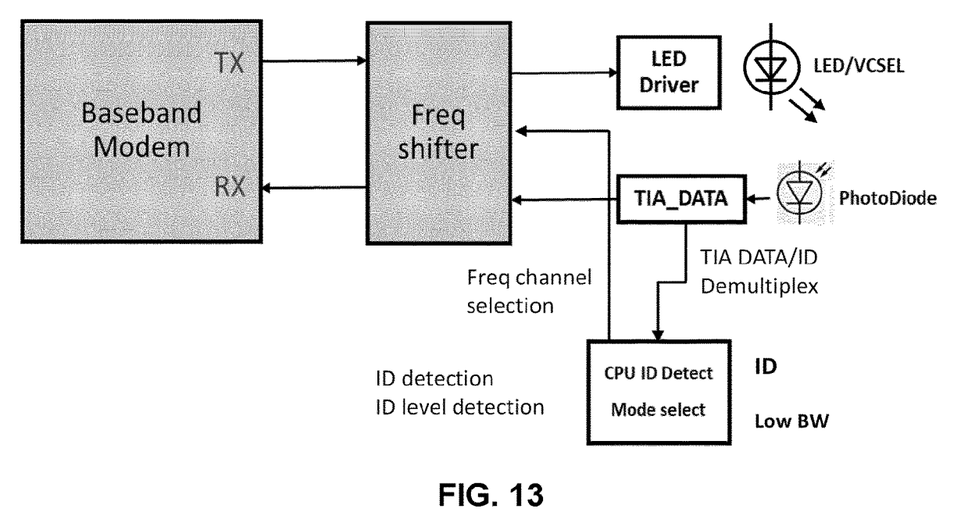
FIG. 13 provides one implementation example of adjusting the end device corresponding to the selected access point.

FIG. 13 provides one implementation example of adjusting the end device corresponding to the selected access point. In this example, baseband signals from the modem are shifted in frequency to the desired frequency channel or uploaded to the desired intermediate frequency Fif. The ID detection can be done via a dedicated low power photodiode or to be done with the photodiode for data communication, as drawn in the figure. The AP can multiplex the ID signal with the data signal since the ID signal is transmitted at an unused frequency band (near DC) for data communication (such as 1 MHz or lower, while data communication starts from 2.5 MHz with Fif=12.5 MHz and BW=20 MHz). The detected ID signal is demultiplexed by the ED by passing through filters and then decoded to determine which access point to select or which channel to use. And then, Fif is shifted to the corresponding frequency.

Figure 14:
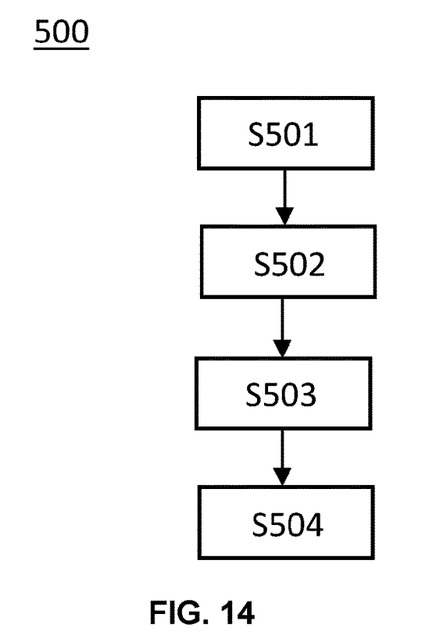
FIG. 14 shows a flow diagram of a method of an end device.

FIG. 14 shows a flow diagram of a method 500 of an end device 110 for establishing a data link with one out of a plurality of access points 120 in a multi-cell wireless communication network 100. In step S501, the end device 100 detects on an optical signaling channel for one or more identification codes; and in step S502, the end device 100 selects an access point for establishing the data link, according to the detection of the one or more identification codes. In a further step S503, the end device 110 adjusts one or more settings corresponding to the selected access point 120; and then in step S504, establishes (the data link with the selected access point after the adjustment. The plurality of access points comprises at least one optical access point, and each one of the one or more identification codes is used to specify one or more settings of one optical access point.

The methods according to the invention may be implemented on a computer as a computer implemented method, or in dedicated hardware, or in a combination of both.

Executable code for a method according to the invention may be stored on computer/machine readable storage means. Examples of computer/machine readable storage means include non-volatile memory devices, optical storage medium/devices, solid-state media, integrated circuits, servers, etc. Preferably, the computer program product comprises non-transitory program code means stored on a computer readable medium for performing a method according to the invention when said program product is executed on a computer.

Methods, systems, and computer-readable media (transitory and non-transitory) may also be provided to implement selected aspects of the above-described embodiments.

The term "controller" is used herein generally to describe various apparatus relating to, among other functions, the operation of one or more network devices or coordinators. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, compact disks, optical disks, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network.

The invention claimed is:

1. A method carried out by an end device of establishing a data link by selecting one out of a plurality of access points in a multi-cell wireless communication network, wherein the plurality of access points comprises at least one optical access point and one radio frequency, RF, based access point, the method comprising the end device:
   monitoring an optical signaling channel for occurrence of one or more identification codes, wherein each one of the one or more identification codes is used to uniquely identify an optical access point, wherein the one or more identification codes are orthogonal to each other;
   selecting an access point for establishing the data link, according to the detection of the one or more identification codes, and wherein the data link is established on another channel different from the optical signaling channel in frequency; and the other channel can be either an optical data channel or an RF data channel;
   wherein the selection of the access point further comprising:
      selecting a RF based access point when no identification code is detected; and
      selecting an optical access point upon the detection of at least one identification code, and carrying out the further steps of:
         adjusting one or more settings corresponding to the selected optical access point, wherein the one or more settings comprise at least one hardware configuration; and
         establishing the data link on the other channel with the selected optical access point after the adjustment.

2. The method according to claim 1, wherein when there are more than one identification code detected, the optical access point corresponding to the identification code detected with better received signal quality is selected for establishing the data link.

3. The method according to claim 1, wherein each one of the one or more identification codes is further used to specify a sub channel within an optical communication band to be used as the optical data channel for the data link.

4. The method according to claim 3, wherein when there is only one identification code detected, the optical data channel may be extended to include more than one sub channels within the optical communication band.

5. The method according to claim 3, wherein the one or more identification codes are further used to specify a configuration to be used on the data link.

6. A non-transitory computer readable medium comprising instructions which, when the instructions are executed by a processor of an end device cause the processor to perform the method of claim 1.

7. An end device for establishing a data link by selecting one out of a plurality of access points in a multi-cell wireless communication network, wherein the plurality of access points comprises at least one optical access point and one radio frequency (RF) based access point, the end device comprising:
- an optical receiver configured to monitor an optical signaling channel for occurrence of one or more identification codes; wherein each one of the one or more identification codes is used to uniquely identify an optical access point, wherein the one or more identification codes are orthogonal to each other;
- a controller configured to select an access point for establishing the data link, according to the detection of the one or more identification codes; wherein when no identification code is detected, an RF based access point is selected, and when at least one identification code is detected, an optical access point is selected upon the detection; and
- a wireless communication transceiver configured to adjust one or more settings corresponding to the selected access point and to establish the data link with the selected access point after the adjustment, when the selected access point is an optical access point;
- wherein the one or more settings comprise at least one hardware configuration.

8. The end device of claim 7, wherein the wireless communication transceiver is further configured to support either optical communication or RF communication upon the adjustment of one or more settings.

9. The end device of claim 8, wherein the optical receiver is part of the wireless communication transceiver.

10. A multi-cell wireless communication system comprising:
- at least one end device of claim 7;
- at least one RF access point configured to set up data communication with the at least one end device; and
- at least one optical access point configured to set up data communication with the at least one end device;
wherein the at least one optical access point is further configured to send an identification code on an optical signaling channel.

11. A method carried out by an end device of establishing a data link by selecting one out of a plurality of access points in a multi-cell wireless communication network, wherein the plurality of access points comprises at least one optical access point and one radio frequency, RF, based access point, the method comprising the end device:
- monitoring an optical signaling channel for occurrence of one or more identification codes, wherein each one of the one or more identification codes is used to uniquely identify an optical access point, wherein each one of the one or more identification codes is further used to specify a sub channel within an optical communication band to be used as the optical data channel for the data link;
- selecting an access point for establishing the data link, according to the detection of the one or more identification codes, and wherein the data link is established on another channel different from the optical signaling channel in frequency; and the other channel can be either an optical data channel or an RF data channel;
wherein the selection of the access point further comprising:
- selecting a RF based access point when no identification code is detected; and
- selecting an optical access point upon the detection of at least one identification code, and carrying out the further steps of:
- adjusting one or more settings corresponding to the selected optical access point, wherein the one or more settings comprise at least one hardware configuration; and
- establishing the data link on the other channel with the selected optical access point after the adjustment.

12. The method according to claim 11, wherein when there is only one identification code detected, the optical data channel may be extended to include more than one sub channels within the optical communication band.

13. The method according to claim 11, wherein the one or more identification codes are further used to specify a configuration to be used on the data link.

14. The method according to claim 11, wherein when there are more than one identification code detected, the optical access point corresponding to the identification code detected with better received signal quality is selected for establishing the data link.

15. An end device for establishing a data link by selecting one out of a plurality of access points in a multi-cell wireless communication network, wherein the plurality of access points comprises at least one optical access point and one radio frequency (RF) based access point, the end device comprising:
- an optical receiver configured to monitor an optical signaling channel for occurrence of one or more identification codes; wherein each one of the one or more identification codes is used to uniquely identify an optical access point, wherein each one of the one or more identification codes is further used to specify a sub channel within an optical communication band to be used as the optical data channel for the data link;
- a controller configured to select an access point for establishing the data link, according to the detection of the one or more identification codes; wherein when no identification code is detected, an RF based access point is selected, and when at least one identification code is detected, an optical access point is selected upon the detection; and
- a wireless communication transceiver configured to adjust one or more settings corresponding to the selected access point and to establish the data link with the selected access point after the adjustment, when the selected access point is an optical access point;
- wherein the one or more settings comprise at least one hardware configuration.

16. The end device of claim 15, wherein the wireless communication transceiver is further configured to support either optical communication or RF communication upon the adjustment of one or more settings.

17. The end device of claim 16, wherein the optical receiver is part of the wireless communication transceiver.

18. A multi-cell wireless communication system comprising:
- the at least one end device of claim 15;
- at least one RF access point configured to set up data communication with the at least one end device; and at least one optical access point configured to set up data communication with the at least one end device;

wherein the at least one optical access point is further configured to send an identification code on an optical signaling channel.

\* \* \* \* \*